United States Patent [19]

Weinstein et al.

[11] Patent Number: 4,621,873

[45] Date of Patent: Nov. 11, 1986

[54] QUICK RELEASE ASSEMBLY WITH INTEGRAL LOCK

[76] Inventors: Mark F. Weinstein, 99 Old Stamford Rd., New Canaan, Conn. 06840; Craig H. Yerkes, 27 Lyman St., Springfield, Mass. 01106

[21] Appl. No.: 735,093

[22] Filed: May 17, 1985

[51] Int. Cl.⁴ .......................... B62K 25/02; B62H 5/00
[52] U.S. Cl. .................................. 301/124 R; 70/225; 70/230; 70/233
[58] Field of Search ......... 70/225, 230, 233, DIG. 26, 70/DIG. 30, 210; 301/124 R, 125, 111, 114

[56] References Cited

U.S. PATENT DOCUMENTS

| 1,419,024 | 6/1922 | Cook | 70/210 |
| 1,602,152 | 10/1926 | Gillen | 70/210 X |
| 2,377,465 | 6/1945 | Turner | 70/230 |
| 4,028,915 | 6/1977 | Stahl | 70/210 X |
| 4,114,409 | 9/1978 | Scire | 70/225 |

FOREIGN PATENT DOCUMENTS 2092658 8/1982 United Kingdom ................. 70/210

Primary Examiner—David A. Scherbel
Attorney, Agent, or Firm—N. J. Aquilino

[57] ABSTRACT

A quick release locking assembly including an integral lock and protected opposite end formed in combination with a quick release apparatus for securing a wheel to a bicycle frame in a theftproof manner. The hand-operated lever of the quick release is prevented from rotating by a locking pin which engages a bore in the quick release assembly to prevent rotation thereof, while the adjustable nuts on the opposite threaded end are prevented from being removed by the end cap housing which encases and protects the nuts in a manner such that neither the end cap housing or the nuts can be removed when the assembly is mounted on a bicycle. When secured, the quick release lever cannot be rotated, nor can the nuts securing the opposite end be accessed, offering complete security to the object secured.

7 Claims, 12 Drawing Figures

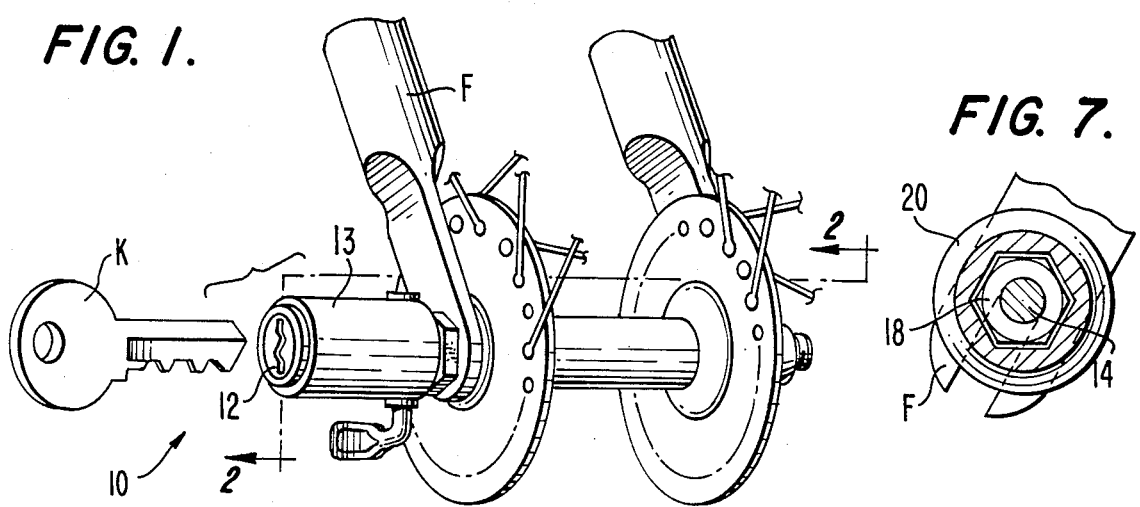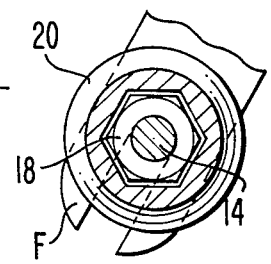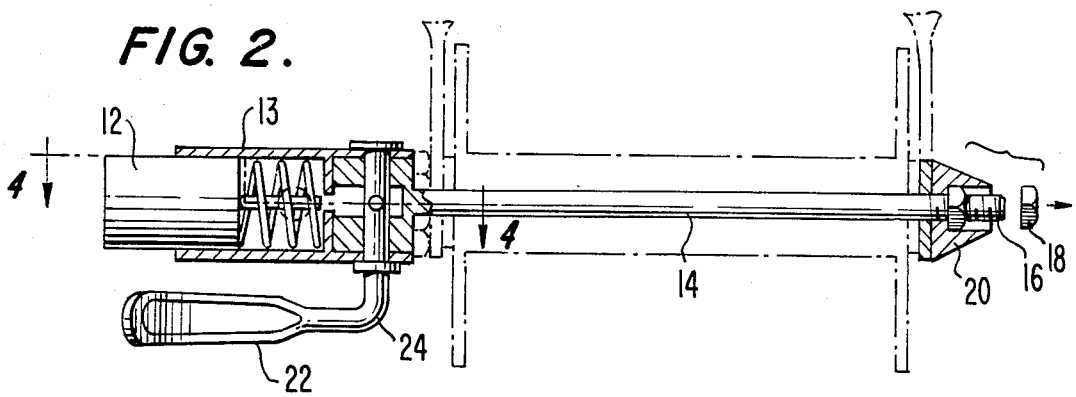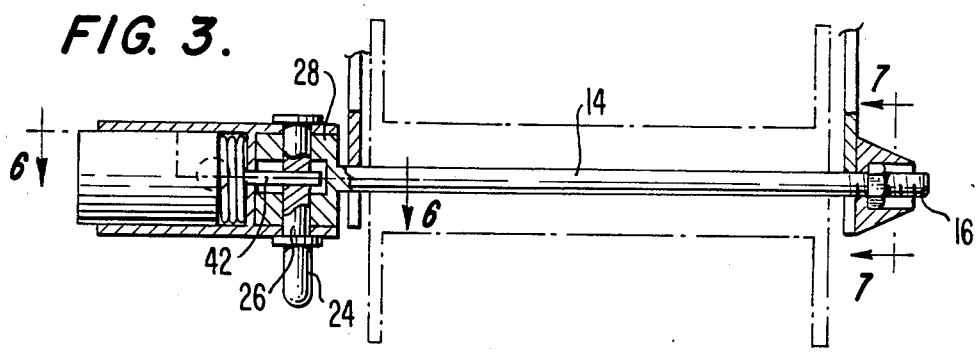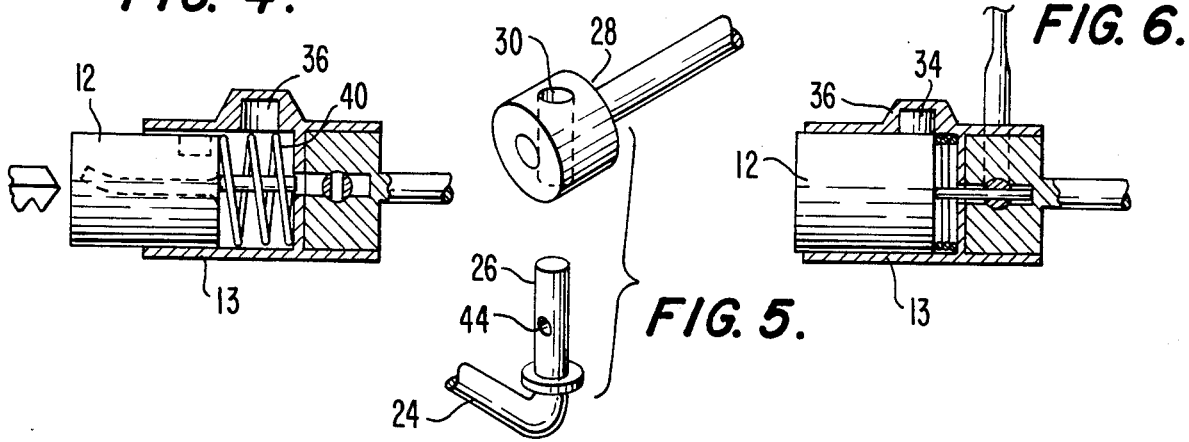

QUICK RELEASE ASSEMBLY WITH INTEGRAL LOCK

BACKGROUND OF THE INVENTION

This invention relates to quick release mechanisms for securing an object, and more particularly to a bicycle quick release having a lock assembly to prevent unauthorized wheel removal.

Bicycles are provided with quick release mechanisms for the wheels which allow the wheels to be removed quickly and easily without the use of tools. A conventional type of quick release includes a hand-operated lever which controls a cam shaft for releasing and securing to the fork of the bicycle frame. Because of the ease with which the wheels may be removed, it is desirable to secure the wheels of the bicycles having these quick release mechanisms to prevent theft when the bicycle is unattended. Often this causes the inconvenience of having to remove one or both wheels, and secure them to the frame, while securing the frame to an immovable object when the bicycle is to be left unattended.

Various types of security devices in combination with cables, chains, and so forth have been known to be used for the purpose of securing the bicycle and wheels when unattended. Whereas many of these locks have been found to achieve the required security, such a security system necessitates the carrying and storing of this apparatus at all times, as well as the attaching of it to the bicycle for security during non-use periods. This is a very inconvenient, bulky, and inefficient approach, causing unnecessary expense and effort.

The present invention relates to a bicycle quick release mechanism having an integrally formed lock which requires no additional parts or apparatus to secure the same other than a key when a key-type lock is provided. The locking device permits the user to secure the quick release by preventing the hand-operated lever from being rotated to the open position when the security device is on, while offering total protection to the opposite, threaded end through the use of a protective cap that houses the adjustable nuts when the unit is secured, thereby preventing any tampering with them. The lock includes a pin member which engages a transfer bore on the lever preventing its movement when the lock pin is in place. In one embodiment, the locking device is supported longitudinally with respect to the quick release axis, and in a second embodiment the locking device is supported perpendicular with respect to the longitudinal axis of the quick release. The locking device may be key operated, or alternately, may be a combination-type lock.

Among the objects of the present invention, is the provision of a quick release device for bicycle wheels having an integrally formed lock thereby eliminating the need for additional bicycle locks; the provision for eliminating all need to remove the wheels when securing the bicycle or when leaving the bicycle unattended; the provision of a quick release locking device which is simple to operate and inexpensive while providing maximum security and convenience.

FIG. 1 shows a perspective view of the quick release locking assembly of the present invention including a partial view of a bicycle wheel and frame.

FIG. 2 is a sectional view of the quick release locking assembly taken along lines 2—2 of FIG. 1.

FIG. 3 is a sectional view of the quick release locking assembly taken along lines 3—3 of FIG. 1.

FIG. 4 is a sectional view of a detail of the assembly taken along lines 4-4 of FIG. 2.

FIG. 5 is a view of a detail of the invention.

FIG. 6 is a sectional view of a detail of the assembly taken along lines 6—6 of FIG. 3.

FIG. 7 is a sectional view of a detail of the assembly taken along lines 7—7 of FIG. 6.

DESCRIPTION OF THE PREFERRED EMBODIMENTS

Figure 8:
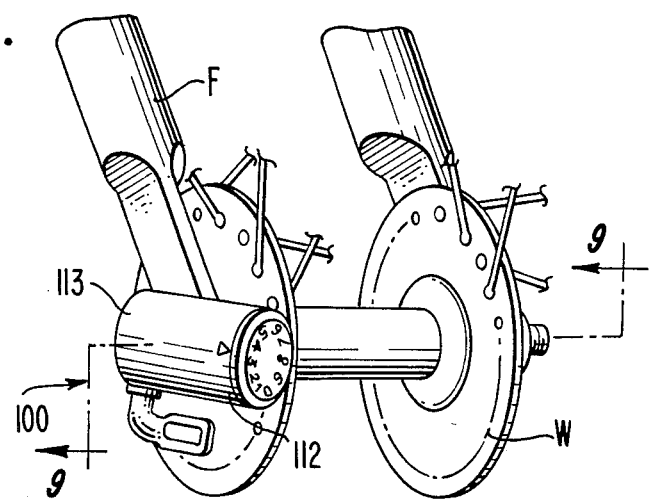
FIG. 8 is a perspective view of another embodiment of the quick release locking assembly of the present invention.

FIGS. 1 to 7 illustrate one preferred embodiment of the present invention. FIG. 1 illustrates the quick release locking assembly 10 attached to a bicycle wheel W and frame F. The quick release locking assembly 10 includes an integral lock 12 operated by a key K which is located in cylindrical housing 13 on the longitudinal axis of the assembly 10. As shown in FIGS. 2 and 3, the assembly 10 includes a central mounting shaft 14, having a threaded end 16 adapted to receive threaded adjustable nuts 18 and an end cap housing 20 which secures the assembly to the bicycle frame F. The quick release includes a hand-operated lever 22 attached to a crank arm 24 which is attached at a right angle to an eccentric cylinder drive 26. The other end of the shaft 14 opposite the threaded end 16, terminates in a shaft extension including a cylindrical head 28 having a bore 30 which is sized to snugly receive the eccentric cylinder drive 26. With the quick release in place, rotation of the lever 22 causes the eccentric cylinder drive 26 to rotate within the bore 30 of the head 28. Because of the eccentric mounting of the cylinder drive 26, the head 28 and shaft 14 connected thereto will move longitudinally with respect to a fixed point, in this case, the bicycle frame F thereby loosening and tightening the assembly 10 relative to the frame F. This type of quick release mechanism is known in the art.

The present invention provides a lock 12 attached to and cooperating with the quick release. The lock 12 is mounted in the cylindrical housing 13. The lock 12 mechanism includes a bolt 34 which fits into a recess 36 in the housing 13. In this embodiment, the lock 12 is conventional in design and is operated by a key K. The lock 12 is biased outwardly by means of a spring 40 so when the bolt 34 is recessed within the lock body the lock 12 is free to move longitudinally within the cylindrical housing 13. The lock 12 is maintained in the inward position against the bias of the spring 40 when the bolt 34 is extended into the recess 36.

The adjustable nuts 18 are positioned within a longitudinal bore 34 in the end cap housing 20 which encases and protects the nuts 18 so that the nuts 18 cannot be removed when the quick relase locking assembly is on the bicycle frame F.

The lock 12 mechanism is provided with a longitudinal pin 42 at its forward end. The pin 42 is adapted to fit within a bore 44 in the eccentric cylinder drive 26 when it is properly aligned. The bore 44 is designed to be in longitudinal alignment with the pin 42 when the quick release lever 22 is in the closed position for holding the wheel W secured to the bicycle frame F. The pin 42 is seated within the bore 44 by merely pushing the lock 12 inwardly within the cylindrical housing 13 against the bias of the spring 40. The bolt 36 engages the recess 38 which maintains the lock 12 in the inward position which retains the pin 42 within the bore 44 until the lock 12 is released by the key K. When the pin 42 is seated within the bore 44, it prevents rotation of the eccentric cylinder 26 and lever 22 locking it against rotational movement. The spring 40 would then force the lock 12 outwardly within the housing 13 thereby removing the pin 42 from the bore 44 and permitting the lever 22 to be rotated to open the quick release assembly.

Figure 9:
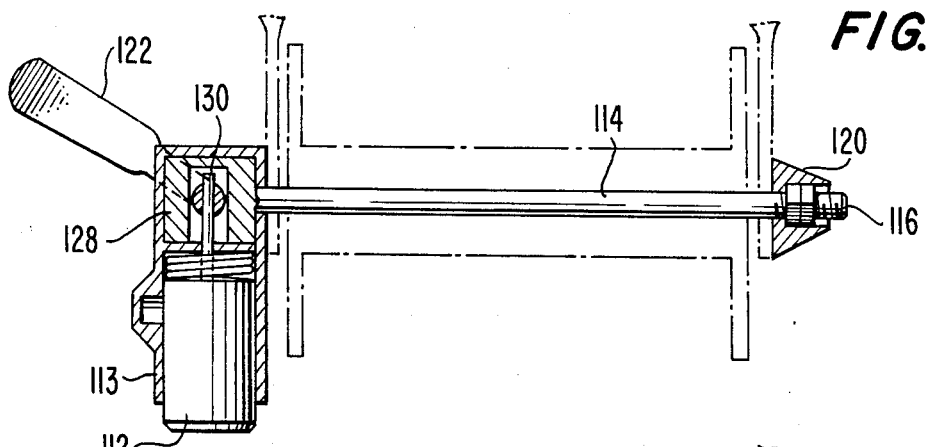
FIG. 9 is a sectional view of the assembly taken along lines 9—9 of FIG. 8.
Figure 10:
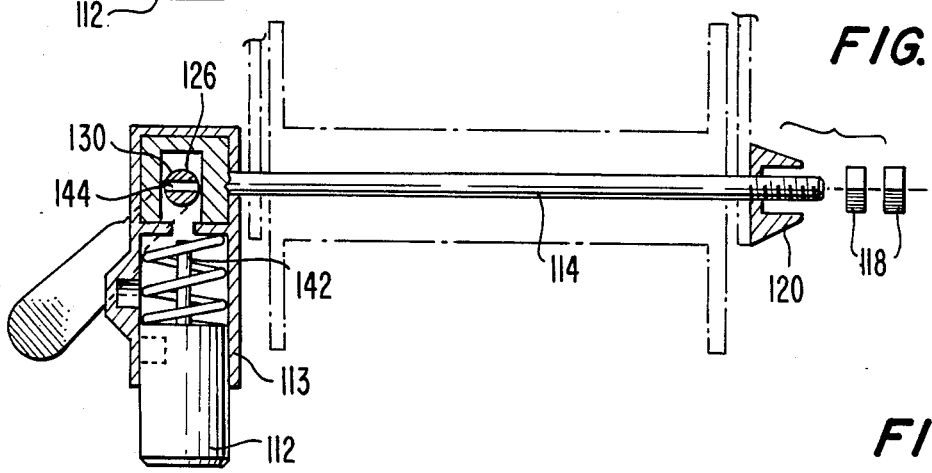
FIG. 10 is a sectional view of the assembly taken along lines 10—10 of FIG. 8.
Figure 11:
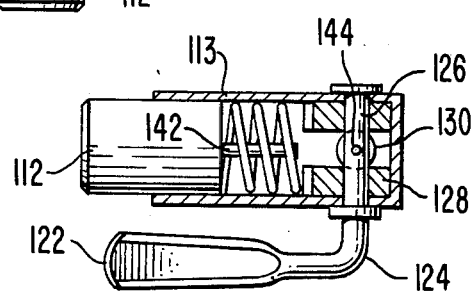
FIG. 11 is a detailed sectional view of the assembly of FIG. 8 showing the lock in the outer retracted position.
Figure 12:
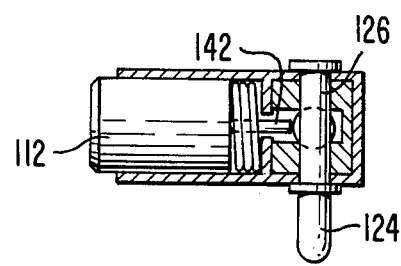
FIG. 12 is a detailed sectional view of the assembly of FIG. 8 showing the lock in the inner actuated position.

FIGS. 8, 9 and 10 show another embodiment of a quick release locking assembly 100 attached to a bicycle wheel W and frame F. The assembly 100 includes an integral lock 112, which in this embodiment is a combination lock. The lock 112 is located within a housing 113 perpendicular to the longitudinal axis of the assembly 100. As with the first embodiment, the assembly 100 includes a central mounting shaft 114 having a threaded end 116 adapted to receive threaded nuts 118 and an end cap 120 which secures the assembly to the bicycle frame F.

The quick release and locking means includes a hand-operated lever 122, a suitable crank arm 124, and an eccentric cylinder drive 126. The other end of the shaft 114 terminates in a cylindrical head 128, the axis of which is perpendicular to the axis of the shaft 114. The head 128 includes a cylindrical bore 130 which is adapted to receive the eccentric cylinder drive 126. As with the first embodiment, the eccentric cylinder drive 126 includes a bore 144 which is adapted to receive a locking pin 142 and operate in generally the same manner as described with respect to the embodiment of FIGS. 1 through 7. The parts not described in detail conform to the parts of the embodiment of FIGS. 1 through 7.

Whereas, the quick release assembly has been described in terms of securing a bicycle wheel to a bicycle frame, the quick release can be used for any device or piece of equipment which can be connected to a second piece of equipment using an elongated bolt. For example, the quick release assembly can be used to secure the seat of a bicycle in a quick release manner. Other uses are apparent, such as mounting trash containers, fire extinguishers, among many other things.

Also, it will be appreciated that modifications may be made in the disclosed embodiments of the quick release assembly without departing from the spirit and scope of the present invention as defined in the following claims.

What we claim is:

1. A bicycle wheel quick release assembly for securing the wheel to the fork of a bicycle frame comprising:
    a central mounting shaft having a first end threaded to receive locking nuts and an end cap and a second end formed of a cylindrical shaft extension having a transverse bore therein;
    cylindrical housing means including a first chamber having an opening to receive said cylindrical shaft extension for reciprocal movement therein, and a second chamber having an opening to receive a locking mechanism including a locking pin;
    drive means, including a rotatable lever and eccentric drive shaft, said eccentric drive shaft having a transverse bore therein adapted to receive said locking pin, said eccentric drive shaft being rotatably mounted within said shaft extension transverse bore for longitudinally moving said central mounting shaft and said shaft extension relative to said bicycle frame fork for loosening and tightening said assembly relative to said fork;
    said locking pin being in communication with said eccentric drive shaft whereby, in use, said locking pin is selectively moveable to engage and disengage said drive shaft transverse bore of said eccentric drive shaft to prevent and permit rotational movement thereof respectively, in turn preventing and permitting longitudinal movement of said central mounting shaft relative to said bicycle frame fork.

2. The bicycle wheel quick release assembly of claim 1 wherein said first chamber and said second chamber include an opening therebetween to accommodate said selectively moveable locking pin.

3. The bicycle wheel quick release assembly of claim 1 wherein said cylindrical housing means is further characterized by having its longitudinal axis in line with said central mounting shaft.

4. The bicycle wheel quick release assembly of claim 1 wherein said cylindrical housing means is further characterized by having its longitudinal axis perpendicular to said central mounting shaft.

5. The assembly of claim 1 wherein said locking mechanism is characterized by being operated by a key.

6. The bicycle wheel quick release assembly of claim 1 wherein said locking mechanism is further characterized by including a combination lock mechanism.

7. The bicycle wheel quick release assembly of claim 1 wherein said end cap includes a longitudinal bore for said locking nuts on said threaded shaft end, whereby said locking nuts are inaccessible from the exterior of said end cap when said quick release assembly is secured on said bicycle frame fork.

* * * * *